April 8, 1969 W. G. BROWN 3,437,755

MULTIPLEX CHANNEL GATE PULSE GENERATOR FROM AN INTERMIXTURE OF TIME DIVISION MULTIPLEX PULSE TRAINS

Filed March 11, 1965

Sheet 1 of 2

INVENTOR
WARREN G. BROWN

BY Alfred C. Hill

AGENT

April 8, 1969 W. G. BROWN 3,437,755

MULTIPLEX CHANNEL GATE PULSE GENERATOR FROM AN INTERMIXTURE OF TIME DIVISION MULTIPLEX PULSE TRAINS

Filed March 11, 1965

INVENTOR
WARREN G. BROWN
BY
Alfred C. Hill
AGENT

United States Patent Office 3,437,755

Patented Apr. 8, 1969

3,437,755

MULTIPLEX CHANNEL GATE PULSE GENERATOR FROM AN INTERMIXTURE OF TIME DIVISION MULTIPLEX PULSE TRAINS

Warren G. Brown, River Vale, N.J., assignor to International Telephone and Telegraph Corporation, a corporation of Delaware Filed Mar. 11, 1965, Ser. No. 439,037
Int. Cl. H04l 5/22; H03k 5/06, 3/04
U.S. Cl. 178—50 19 Claims

ABSTRACT OF THE DISCLOSURE

Channel gate pulses are produced for an intermixture of three TDM trains of different repetition rates by a first delay line and logic circuitry to produce and synchronize channel gate pulses for a first TDM train in response to the intermixed pulse trains, a second delay line and logic circuitry to produce and synchronize channel gate pulses for a second TDM train in response to the intermixed pulse trains and a control signal from the first logic circuitry indicating synchronization therein, and a counter and decoding matrix to produce and synchronize channel gate pulses for a third TDM train in response to a control signal from the second logic circuitry indicating synchronization therein. The delay lines each have at least half as many taps as required to produce the associated channel gate pulses, the delay line being triggered by the intermixed trains and retriggered through the logic circuitry by the channel gate pulse appearing at the last tap of the delay line to produce the required number of channel gate pulses.

Figure 1:
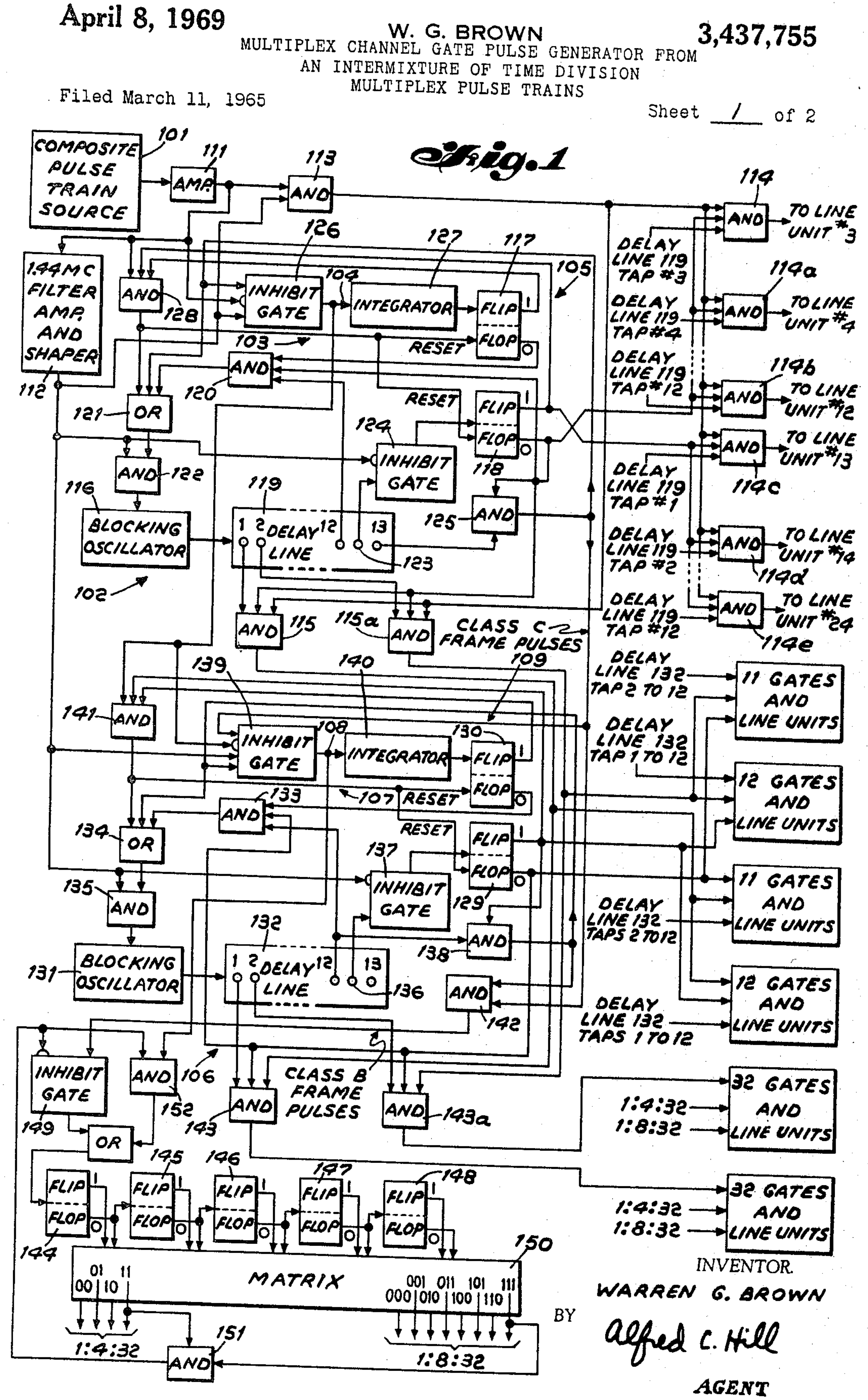

This invention relates to pulse generators and, more particularly to a generator to produce channel gate pulses for separation of the channels from a composite time division multiplex pulse train including an intermixture of time division multiplex pulse trains or channels of different repetition rates.

A system has been proposed to provide multi-speed service wherein a plurality of time division multiplex pulse trains of different repetition rates are intermixed to permit sharing of radio and cable systems along with a large portion of channel drop facilities and switching facilities of available communication systems. An example of such a system is one in which class C service includes a frame every 17.35 microseconds having 25 pulses per frame. The adjacent channel pulses of the class C frame are spaced 0.695 microsecond apart. Thus, the class C frame rate is 57.6 kilocycles per second and class C channel pulse rate is 1.44 megacycles where twenty-four channel pulses are used for conveying data and the twenty-fifth pulse provides synchronizing information. At least one of the class C data channels is employed for class B and class A service. There is provided twenty-four class B channels having a frame rate of 2400 cycles per second (416.7 microsecond frame width). At least one of class B channels will be employed for class A service. There is provided thirty-two class A channels having a frame rate of 75 cycles per second (13.3 millisecond frame width).

As set forth hereinabove, class A service is a low speed service which may be utilized for Teletype, class B service is a medium speed service which may be utilized for data transmission such as derived from card or tape readers, and class C service is a high speed service utilized for delta or pulse code modulation data, such as digitally coded voice signals.

To permit the demultiplexing of the class A, B and C channels from the composite pulse train, as defined herein, it will be necessary to provide a pulse generator.

Therefore, an object of this invention is to provide a pulse generator to produce channel gate pulses for a composite time division multiplex pulse train including an intermixture of time division multiplex pulse trains or channels of different repetition rates such as described hereinabove.

A feature of this invention is the provision of a source of composite pulse trains including a first plurality of time division multiplex channels, at least a second plurality of time division multiplex channels occupying one channel of the first multiplex channels and a synchronizing signal having a predetermined pattern related to the repetition rates of the first and second plurality of multiplex channels. A first means is coupled to the source to produce a first series of channel gate pulses at the repetition rate of the channels of the first plurality of channels. A second means is coupled to the source and the first means responsive to a given one of the first series of gate pulses and the composite pulse train to produce a control signal indicating the presence or absence of time coincidence between the given one of the first series of gate pulses and the synchronizing signal. A third means is coupled to the second means, the source and the first means responsive to the control signal to synchronize the first series of gate pulses to the channel pulse of the first plurality of multiplex channels. A fourth means is coupled to the source to produce a second series of channel gate pulses at the repetition rate of the channels of the second plurality of multiplex channels. A fifth means coupled to the second means and the fourth means responsive to the given one of the second series of gate pulses and the control signal to synchronize the second series of gate pulses to the channels of the second plurality of multiplex channels.

Another feature of this invention is the provision of a third plurality of time division multiplex channels occupying one channel of the above-described second plurality of time division multiplex channels with the fifth means providing a second control signal which is utilized by a sixth means to produce and synchronize the channel gate pulses for the third plurality of time division multiplex channels.

Another feature of this invention is the provision of a novel arrangement to produce the series of gate pulses including a delay line having taps spaced therealong according to the spacing of the channels of its associated plurality of channels and equal in number to at least one half the number of channels of its associated plurality of channels, means coupled to the source to trigger the delay line, means coupled to the last of the taps of the delay line to retrigger the delay line, and a bistable device coupled to the source and the delay line to define in cooperation with the output of the taps the timing of the associated ones of the series of gate pulses.

A further feature of this invention is the provision of a binary counter and a matrix coupled to the above-mentioned arrangement to provide the gate pulses for the first and second plurality of time division multiplex channels to produce the channel gate pulses for the third plurality of time division multiplex channels.

Figure 2:
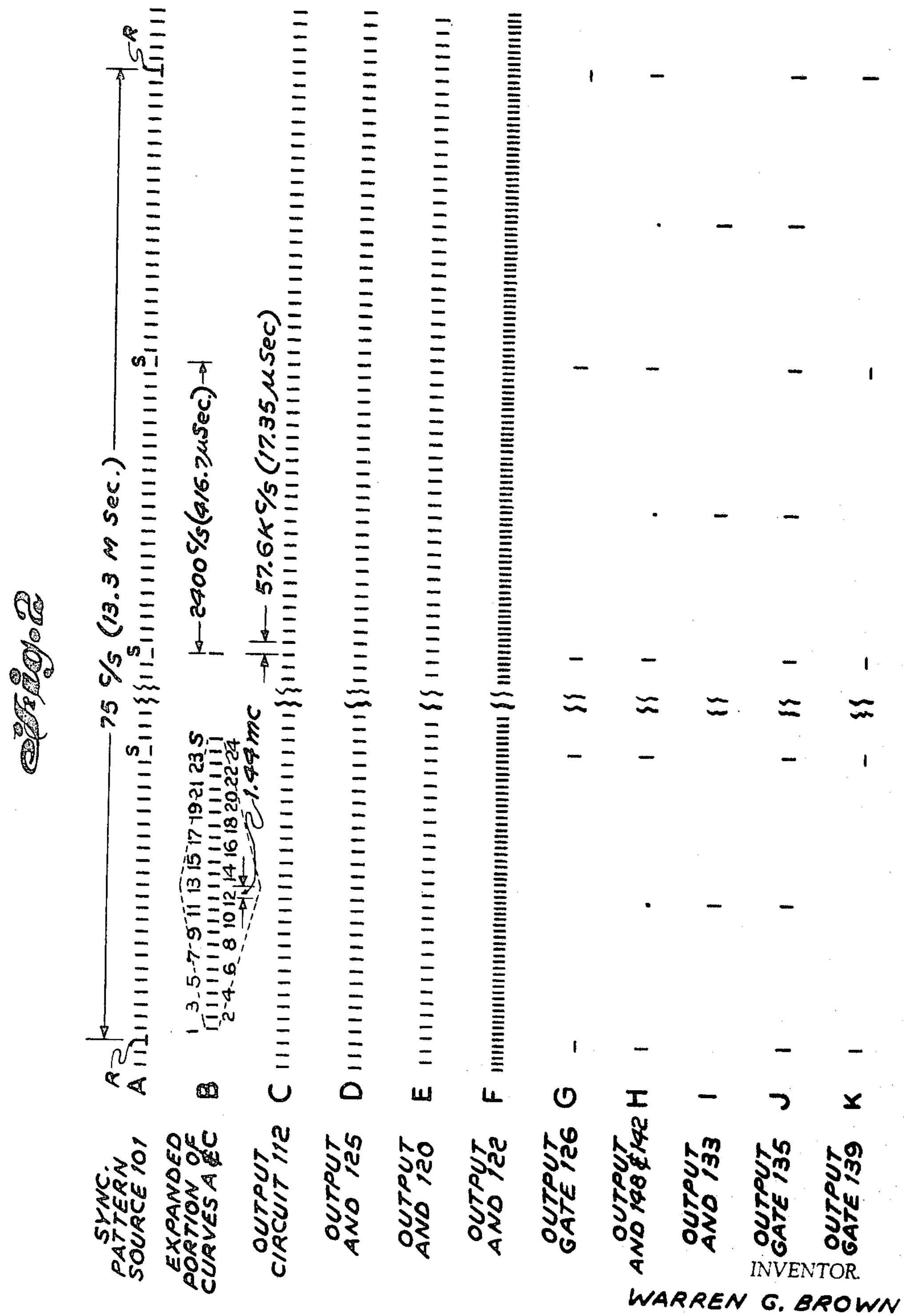

The above mentioned and other features and objects of this invention will become more apparent by reference to the following description taken in conjunction with the accompanying drawings, in which:

FIG. 1 is a schematic diagram in block form of one embodiment of the pulse generator in accordance with the principles of this invention; and FIG. 2 is a plurality of curves present at different points in the pulse generator of FIG. 1 to aid in the description thereof.

To permit demultiplexing the class A and class B channels from the composite pulse train, it is necessary to provide timing signals at the 75 and 2400 per second rate in addition to the timing signals at a 57,600 per second rate for the channels of class C service. One method of doing this is to provide a synchronizing signal having blanks every twenty-fourth class C framing pulse, that is, at the start of each class B frame, except for the class C framing pulse which occurs at the start of each A frame. The class C pulse generator will generate control pulses to assure that the class C pulse generator is synchronized with the incoming synchronizing signal and to control the synchronization of the class B pulse generator. The class B pulse generator will also produce control pulses to assure that the class B pulse generator is synchronized with the incoming synchronizing signal and to control the synchronization of the class A pulse generator.

This method of synchronization can have rather good noise immunity and the class C and class B pulse generators would employ integrators which would prevent them from reframing unless a cluster of control pulses, exceeding a given threshold, is received. Extra control pulses from the class C pulse generator will not throw the class B pulse generator out of frame. The class A pulse generator could be either flywheel or start-stop. A reasonably high degree of noise immunity can be obtained in the class A pulse generator without a complete flywheel circuit.

Basically, the pulse generator of this invention, illustrated in FIG. 1, employs a source 101 providing a composite pulse train including a first plurality of time division multiplex channels (class C channels), a second plurality of time division multiplex channels (class B channels) occupying at least one channel of the first multiplex channels, a third plurality of time division multiplex channels (class A channels) occupying at least one channel of the second multiplex channels, and a synchronizing signal having a predetermined pattern related to the repetition rates of the three plurality of multiplex channels. A first means 102 is coupled to source 101 to produce a first series of channel gate pulses at the repetition rate of the channels of the first plurality of multiplex channels. A means 103 coupled to source 101 and means 102 responsive to a given one of the first series of gate pulses and the composite pulse trains produces a first control signal at 104 indicating the presence or absence of time coincidence between the given one of the first series of gate pulses and the synchronizing signal. A means 105 coupled to means 103, source 101, and means 102 responsive to the first control signal at 104 synchronizes the first series of gate pulses to channels of the first plurality of multiplex channels. Another portion of the pulse generator includes means 106 coupled to source 101 to produce a second series of channel gate pulses at the repetition rate of the channels of the second plurality of multiplex channels. A seventh means 107 coupled to source 101, means 103 and means 106 responsive to a given one of the second series of gate pulses, the composite pulse train and the first control signal produces a second control signal at point 108 indicating the presence or absence of time coincidence between the given one of the second series of gate pulses and the first control signal. A means 109 coupled to means 107, source 101 and means 106 responsive to the second control signal synchronizes the second series of gate pulses to the channels of the second plurality of multiplex channels. To provide the channel gate pulses for the third plurality of multiplex channels a means 110 is coupled to means 107 and means 106 responsive to the second control signal at point 108 and one of the second series of gate pulses to produce a third series of channel gate pulses synchronized to the third plurality of multiplex channels.

The generator of this invention is a combination of timing circuits to produce channel gate pulses required to demultiplex an incoming composite time division multiplex pulse train which, as described hereinabove, includes class C, class B and class A service, each class of service requiring different pulse rates. The various pulse generators described operate in cascade with the class C clock including means 102, 103, and 105 operating independently and furnishing the required inputs to class B clock including means 106, 107 and 109 while the class A clock including means 110 requires the inputs from the class B clock.

Referring to FIGS. 1 and 2 the composite pulse train, curve A, FIG. 2, of source 101 is coupled to amplifier 111 for amplification and reshaping. The output of amplifier 111 is coupled to filter, amplifier and shaper circuit 112 to derive the master clock rate 1.44, curve C, FIG. 2, from the composite pulse train.

The curves of FIG. 2 are shown to represent the synchronized condition of the pulse generator of this invention. In addition, curve A only illustrates the synchronizing pulses of the composite pulse train and curve C represents the pulses at the output of circuit 112 in coincidence with the position of the synchronizing pulses of the composite pulse train. Curve B illustrates the pulses present in one frame of the composite pulse train of curve A and the basic master rate pulse of this same frame as would be found at the output of circuit 112. It should be remembered that the pulses of curve B would appear between each of the adjacent synchronizing pulses or a synchronizing pulse and the adjacent position of a synchronizing pulse of curve A. Also the pulses of curve B will appear between each of the adjacent pulses of curve C as produced at the output of circuit 112.

Curve A illustrates the predetermined pattern of the synchronizing signal of the composite pulse train. This pattern includes a synchronizing pulse for each frame of class C service except at the beginning of a class B frame where the class C synchronizing pulse is blanked as illustrated at S in curve A. The pattern of the synchronizing signal further includes a pulse at the start of the class B frame in coincidence with the class A frame pulse as illustrated at R in curve A.

The output of amplifier 111 is further coupled to AND gate 113 and, assuming that the synchronizing signal has been found, the output of filter 112 will be in coincidence with the composite pulse train. Thus, gate 113 will pass the composite pulse train to the line unit AND gates 114 and the class B AND gates 115 and **115*a***.

The generation of the gate pulses to permit the passage of the appropriate ones of the channel signals of the composite signal is best described by following the normal cycle of operation after synchronization has been found and then consider the operations involved in searching for the synchronization after the class C pulse generator has lost synchronization due to interruption in service or for other faults.

Thus, assuming that the class C generator is in synchronization, blocking oscillator 116 will fire at synchronization time and both the search flip-flop 117 and the count-control flip-flop 118 are in the "0" state. The blocking oscillator pulse travels down delay line 119 producing gate pulses at the channel taps at the timing of the class C channels. When the pulse reaches the tap for channel 12, the channel 12 gate pulse is gated in AND gate 120 by the two "0" outputs of flip-flops 117 and 118 to produce pulses as shown in curve E, FIG. 2, at a time disposed in the middle of a class C frame. The output pulse of gate 120 is fed back to OR gate 121 to retrigger blocking oscillator 116 through AND gate 122 receiving simultaneously a master clock rate pulse from circuit 112. The pulses from gate 120 are gated with the 1.44 mc. clock square wave output from the circuit 112 to correct for timing error in the delay line. The blocking oscillator 116 is retriggered and starts a new pulse into the delay line. When the first pulse reaches tap 123 disposed between the taps for channels 12 and 13, the output therefrom is inhibited in an inhibit gate 124 by the 1.44 mc. clock pulse from circuit 112. When the 1.44 mc. clock pulse disappears the pulse at tap 123 is passed through gate 124 to set count-control flip-flop 118 to its "1" state. The setting of flip-flop 118 to its "1" state removes the enabled pulse from AND gates 125 to prevent the first pulse traveling on delay line 119 from being passed by AND gate 125 when it reaches the tap for chanel 13. The energy of the first pulse traveling on delay line 119 is dissipated in the termination of this delay.

The first pulse on delay line 119 appears at the tap for channel 13; at the same time the second pulse from oscillator 116 appears at the tap for channel 1. Channel 13 is then derived from gating the output pulse from the tap for channel 1 with the "1" output of the flip-flop 118 in AND gate 114*c*. When the second pulse on delay line 119, caused by the retriggering of blocking oscillator 116 reaches the tap for channel 12, it cannot pass through AND gate 112 since the flip-flop 118 is now in its "1" state. The second pulse proceeds to tap 123 and after being operated upon in inhibit gate 124, in other words, after being clocked by the 1.44 mc. output of circuit 112, resets flip-flop 118 to its "0" state and enables gate 125. When the second pulse reaches the tap for channel 13, gate 125 produces a pulse which is fed back to OR gate 121. The resultant output pulse from gate 121 is clocked with the output signal of circuit 112 in AND gate 122 to produce a pulse for triggering blocking oscillator 116 for the beginning of the next cycle. The output pulse of gate 122 is shown in curve F, FIG. 2 and demonstrates the triggering of gate 122 by the pulse output of gate 125 to establish the time position of one half the information channels and the output pulse of gate 120 to establish the time position of the other half of the information channels for class C service.

The output of gate 125 occurs once per class C frame and is in the class C framing pulse time. All class C channel times can be generated independently by using one side or the other of flip-flop 118 to gate with a pulse from a tap on delay line 119 in channel gates 110 as illustrated in FIG. 1. A choice exists to establish the channel time for channel 13. The pulse output of tap 13 or the pulse output of the tap for channel 1 may be gated with the "1" output of flip-flop 118 in AND gate 114*c*. The pulse output of the tap for channel 1 is selected since the pulse waveform at the beginning of delay line 119 is superior to that at the end of delay line 119.

If the class C pulse generator is not running in synchronization, search control flip-flop 117 must be set to its "1" state. The setting of flip-flop 117 to its "1" state and the resynchronization of the class C pulse generator is accomplished in the following manner. The output from gate 125 is compared with the composite pulse train at the output of amplifier 111, curve A, FIG. 2 and the master timing signal at the output of circuit 112, curve A, FIG. 2, in inhibit gate 126. As long as a pulse is present in the composite pulse train at the output of amplifier 111 inhibit gate 126 is inhibited. If, however, a pulse from gate 125 does not coincide with a pulse in the pulse train at the output of amplifier 11, an error or control pulse is produced and fed into integrator 127. Integrator 127 performs an important function, namely, to prevent the setting of flip-flop 117 to its "1" or search state when class C pulse generator is synchronized by detecting the synchronizing signal pattern of curve A, FIG. 2. Under this synchronized condition gate 126 will produce a control signal as illustrated in curve G, FIG. 2. Integrator 127 is adjusted such that any number of consecutive error or control pulses are required to exceed the threshold established by the normal synchronizing signal pattern and set search flip-flop 117. Thus, integrator 127 prevents the normal control pulses dictated by the synchronizing signal pattern from starting a search cycle and the pulse generator for class C service will stay in synchronization.

If several errors do occur, as recognized by integrator 127, the output therefrom would cause flip-flop 117 to be set to its "1" state to enable search for the synchronizing signal.

Assume that a sufficient number of errors had been detected and flip-flop 117 is set to its "1" state. The pulse from gate 125 has already triggered blocking oscillator 116 by passing through OR gate 121 and AND gate 122 and sent an unwanted pulse into delay line 119. This unwanted pulse travels down delay line 119 but cannot pass through gate 120 since search flip-flop 117 is in its "1" state and has effectively disabled gate 120. Flip-flop 118 is still in its "0" state since an error can only be detected at the end of the counting cycle. When the unwanted pulse reaches tap 123 between the taps for channels 12 and 13, the count control flip-flop 118 changes to its "1" state. The unwanted pulse will be dissipated in the termination of delay line 119 and disappear since gate 125 is not enabled at channel 13 time because flip-flop 118 is in its "1" state.

Then search control flip-flop 117 was set to its "1" state and output signal was sent to AND gate 128 as one of the enabling signals therefor. Since flip-flop 118 was in the "0" state, the other enabling signal was not coupled to gate 128, thereby effectively disabling gate 128. When both flip-flops 117 and 118 are in their "1" state, gate 128 is enabled and the next pulse in the composite pulse train from amplifier 111 passes through AND gate 128, OR gate 121 and is clocked by the 1.44 mc. output from circuit 112 in AND gate 122 resulting in a pulse output to trigger blocking oscillator 116 for the start of a new cycle. The output pulse of AND gate 128 is also used to reset flip-flops 117 and 118 to their "0" state so that the normal cycle is started properly and prevents a second pulse from passing through gate 128. At the end of the counting cycle, that is, when flip-flop 118 is in its "0" state and a pulse is present at tap 13 of delay line 119, the pulse from gate 125 is compared again with the pulse train outputs of amplifier 11 and circuit 112 in inhibit gate 126. If a sufficient number of errors appear, as detected by integrator 127, the search cycle is again started. This searching and testing is continued until the synchronizing pulse is located and insufficient error pulses appear at the output of gate 126 to start the search cycle.

Once synchronization is located the output pulse train from amplifier 111 is applied to AND gate 113, as hereinabove described, for the purpose of retiming the composite pulse train with the output pulse train of circuit 112 before it is sent to the class C line units through AND gates 114 and the lower speed clocks or pulse generators. The pulse train output of gate 113, one of the two output signals from control flip-flop 118 and one of the twelve taps from delay line 119 provide all the information to enable a particular one of the line units to recognize data addressed to it, or channels that should be separated from the composite pulse train for utilization in line units of lower speed data.

In order to increase the capacity of the system, not only is one class C channel reserved for lower speed service, but also a second class C channel is reserved for the lower speed service. By sacrificing this one class C channel, namely, the second class C channel, an additional 23 class B channels and 32 class A channels are available. If for purposes of illustration the first two class C channels are reserved for class B and class A service, the first and second class C channels are gated out of the composite pulse train by AND gates 115 and 115*a* in an identical manner to that which occurs for applying the other class C channels to their proper line units, namely, by means of the channel gate pulse at the first and second taps of delay line 119 and the output pulse from flip-flop 118 in its "0" state.

The output signal of circuit 112 (curve C, FIG. 2), the class C control pulses at point 104 (curve G, FIG. 2), the class C channel train or trains, or channels reserved for the lower speed service, and the class C framing pulse at the output of AND gate 125 (curve D, FIG. 2) are sent to the class B pulse generator for use therein as will be hereinbelow described.

Again the description of this portion of pulse generator of this invention will be described by assuming that the pulse generator is synchronized to the synchronizing signal (curve A, FIG. 2) and running in its normal counting cycle. At the beginning of the class B frame both flip-flops 129 and 130 are in the "0" state and the blocking oscillator 131 fires at synchronization time. The pulse from oscillator 131 travels down delay line 132 to the tap for channel 12. AND gate 133 is enabled by the output pulses from flip-flops 129 and 130 in their "0" state and a pulse from the tap for channel 12 produces the timing pulses of curve I, FIG. 2. These timing pulses from gate 133 are fed back through OR gate 134 whose output is retimed by the 1.44 mc. output of circuit 112 in AND gate 135 to retrigger oscillator 131. The first pulse on delay line 132 reaches the intermediate tap 136 between taps for channels 12 and 13. The pulse output from tap 136 after being retimed by the pulses of circuit 112 passes through inhibit gate 137 to set count control flip-flop 129 to its "1" state. The tap for channel 13 is not used as an output of the class B pulse generator but merely becomes part of the termination. The second pulse from oscillator 131 reaches the tap for channel 1 at channel 13 time and proceeds down delay line 132. When it reaches the tap for channel 12, the count control flip-flop 129 is in its "1" state effectively disabling gate 133 and enabling gate 138. The output pulses of gate 138, curve H, FIG. 2, have the class B frame rate and are coupled to gate 134 and gate 135 to start the next cycle of counting. Curve J, FIG. 2 illustrates the pulses at the output of gate 135 to provide the counting cycles. The output pulse of gate 138 is also coupled to inhibit gate 139 which in conjunction with the control pulse from point 104, the pulse output of circuit 112, and the class C frame pulse from gate 125 determines whether the class B frame pulses are in the proper time position.

Since class B synchronization is recognized from the pattern of the synchronizing signal (curve A, FIG. 2) by the fact that the class C synchronizing pulse is missing at the beginning of a class B frame except where the beginning of a class B frame coincides with the beginning of a class A frame, error or control pulses from point 104 at the output of inhibit gate 126 define the class B frame pulse. If the output pulse of gate 138 is not in the proper phase, the coincidence of output pulse of AND gate 138 and the class C framing pulse at the output of AND gate 125 will not occur simultaneously with the control pulses from point 104. When the control pulse from point 104 does not inhibit gate 139 during the coincidence of the other signals coupled thereto, as set forth above, a control pulse will be fed to integrator 140. When a sufficient number of pulses charge integrator 140, the search control flip-flop 130 will be set to its "1" state. The output pulse from gate 138 which was used to search for synchronization also fired the blocking oscillator 131 and produced an unwanted pulse in delay line 132. This pulse cannot be fed back through AND gate 133 since flip-flop 130 is in its "1" state. When the unwanted pulse reaches the intermediate tap 136, count-control flip-flop 129 is set to its "1" state and the input gate 141 is enabled. The pulse generator waits for the next error pulse from point 104 to appear which passes through gate 141 to trigger the blocking oscillator 131. Both flip-flops 129 and 130 are reset to their "0" state by the output of AND gate 141 and a normal counting cycle is established again. If the class C pulse generator is in sync, its control pulses from point 104 are in the proper time for class B pulse generator to start. Therefore, the first control pulse to pass AND gate 141 is the correct one to start the B pulse generator in the proper phase. Integrator 140 must be arranged to ignore the one error or control pulse caused by the pulse in the pattern of the synchronizing signal representing the start of the class A frame. This control pulse is shown in curve K, FIG. 2. It can be seen that once the class C pulse generator has been synchronized, only a short time is required for class B pulse generator to become synchronized.

The channel gate pulses for class B service is also defined by one of the output signals of flip-flop 129 and one of the output signals taps of delay line 132. In other words, one lead from flip-flop 129 could choose which half of the frame the channel is in and one of the twelve taps on delay line 132 will choose the channel time in that half.

The output pulse of gate 138 is gated with the output pulse of AND gate 125 to provide the class B framing pulse used in the class A pulse generator in AND gate 142. The two pulse trains from AND gate 115 and 115*a* are gated with the taps of channels 1 and 2 and the zero side of flip-flop 129 in AND gates 143 and 143*a* to separate the two multiplex channel pulse trains of class A service for use in the class A line units. The error pulse from point 108 at the output of inhibit gate 139 is also sent to the class A pulse generator for use in locating synchronization time.

Due to the low speed of class A service, the delay line type of distributor becomes impractical and flip-flops must be used in the form of a binary counter. This is the lowest speed of service and has continuous synchronization if the class C and class B pulse generators are in synchronization. Therefore, it is unnecessary for this clock to be of the flywheel type.

Class B frame pulses at the output of gate 142 occurs at the same rate as the class A channel time and precedes them by 0.1 mc. The natural count of the five-stage flip-flop counter including flip-flops 144 to 148 is thirty-two and since this equals the number of class A channels no reset is required in the normal counting cycle. Since the class A synchronization is actually an error for the class B pulse generator, the class B error or control pulses from point 108 provide synchronization for the class A pulse generator. The class B frame pulses occur at the same rate as the class A channels so the flip-flop divider will use these pulses as the pulse input through inhibit gate 149. If the class A pulse generator is in synchronization, the class B control pulse from point 108 will be one count after the flip-flops 144 to 148 have reached the count 11111. This count is taken from the matrix 150 by means of an AND gate 151 and used to inhibit the class B frame pulses in inhibit gate 149. The output of gate 151 also enables AND gate 152. The flip-flops 144 to 148 will then wait for the next class B error or control pulse from point 108 to be applied to gate 152 to change the count of the divider to 00000. When the pulse generator is in synchronization the control pulse from point 108 as far as the counter is concerned will appear to be a class B frame pulse and a steady input to the flip-flops 144 to 148 is maintained. If the pulse generator is not in synchronization, the counter will count to 31 and wait for the next control pulse from point 108 to start the counter in synchronism.

The longest possible time required to synchronize the pulse generator of this invention when it is turned on is two class A frames before the class B pulse generator has been synchronized. Since the class B frame pulses are generated by a "flywheel" pulse generator, it is not affected by noise pulses in the source 101. However, noise pulses can create extra error pulses in the class B pulse generator, but the class A clock can only be affected if the noise pulse cancels the synchronizing pulse at the start of a class A in the signal of source 1 so that no error control pulse is generated by the class B pulse generator. If the system is running and a noise pulse destroys the synchronizing pulse representing the start of class A frame, the class A pulse generator will wait at count 11111 for the next error or control pulse to start in synchronism again. Here, only one frame can be lost by a missing error or control pulse.

The time position of the class A channels is identified by each of the 1:4:32 and 1:8:32 output leads of matrix 150. The clock pulse outputs of matrix 150 are sufficiently wide to gate both the class A pulse train channels coupled to the line units from gates 143 and 143a.

While I have described above the principles of my invention in connection with specific apparatus, it is to be clearly understood that this description is made only by way of example and not as a limitation to the scope of my invention as set forth in the objects thereof and in the accompanying claims.

I claim:

1. A generator to produce channel gate pulses for a composite time division multiplex pulse train including an intermixture of time division multiplex channels of different repetition rates comprising:
a source of said composite pulse train including
a first plurality of time division multiplex channels,
at least a second plurality of time division multiplex channels occupying one channel of said first multiplex channels, and
a synchronizing signal having a predetermined pattern related to the repetition rates of said first and second plurality of multiplex channels;
first means coupled to said source to produce a first series of channel gate pulses at the repetition rate of the channels of said first plurality of channels;
second means coupled to said source and said first means responsive to a given one of said first series of gate pulses and said composite pulse train to produce a control signal indicating the presence or absence of time coincidence between said given one of said first series of gate pulses and said synchronizing signal;
third means coupled to said second means, said source and said first means responsive to said control signal to synchronize said first series of gate pulses to the channels of said first plurality of multiplex channels;
fourth means coupled to said source to produce a second series of channel gate pulses at the repetition rate of the channels of said second plurality of multiplex channels; and
fifth means coupled to said second means and said fourth means responsive to a given one of said second series of gate pulses and said control signal to synchronize said second series of gate pulses to the channels of said second plurality of multiplex channels.

2. A generator according to claim 1,
wherein said first means includes
a delay line having taps therealong spaced according to the spacing of the channels of said first plurality of channels and equal in number to at least one half the number of the channels of said first plurality of channels,
means coupled to said source to trigger said delay line,
means coupled to the last of said taps to retrigger said delay line, and
a bistable device coupled to said source and said delay line to define in cooperation with the output of said taps the timing of said first series of channel gate pulses.

3. A generator according to claim 1,
wherein said second means includes
an inhibitor gate coupled to said source and said first means responsive to a given one of the gate pulses thereof to produce said control signal.

4. A generator according to claim 3,
wherein said third means includes
a bistable device coupled to said inhibitor gate.

5. A generator according to claim 1, wherein
said first and fourth means each include
a delay line having taps therealong spaced according to the spacing of the channels of its associated plurality of channels and equal in number to at least one half the number of the channels of its associated plurality of channels:
means coupled to said source to trigger said delay line;
means coupled to the last of said taps to retrigger said delay line; and
a bistable device coupled to said source and said delay line to define in cooperation with the output of said taps the timing of the associated ones of said series of gate pulses.

6. A generator according to claim 5, wherein
said delay line includes
an extra tap therealong spaced from said last tap equal to the spacing of the preceding taps; and
said second means includes
a coincidence device coupled to said bistable device and said extra tap, and
an inhibitor gate coupled to said source and the output of said coincidence device to produce said control signal.

7. A generator according to claim 6, wherein
said third means includes
a second bistable device coupled to said inhibitor gate.

8. A generator according to claim 1, wherein
said third means includes
a bistable device responsive to said control signal and said composite pulse train to control the gate pulse output of said first means.

9. A generator according to claim 1, wherein
said first and fourth means each includes
a delay line having taps therealong spaced according to the spaing of the channels of its associated plurality of channels and equal in number to at least one half the number of the channels of its associated plurality of channels,
means coupled to said source to trigger said delay line;
means coupled to the last of said taps to retrigger said delay line, and
a bistable device coupled to said source and said delay line to define in cooperation with the output of said taps the timing of the associated ones of said series of gate pulses; and
said seventh means includes
a binary counter, and
a matrix coupled to said counter.

10. A generator to produce channel gate pulses for a composite time division multiplex pulse train including an intermixture of time division multiplex channels of different repetition rates comprising:
a source of said composite pulse train including
a first plurality of time division multiplex channels;
at least a second plurality of time division multiplex channels occupying one channel of said first multiplex channels, and
a synchronizing signal having a predetermined pattern related to the repetition rates of said first and second plurality of multiplex channels;
first means coupled to said source to produce a first series of channel gate pulses at the repetition rate of the channels of said first plurality of channels;
second means coupled to said source and said first means responsive to a given one of said first series of gate pulses and said composite pulse train to produce a control signal indicating the presence or absence of time coincidence between said given one of said first series of gate pulses and said synchronizing signal;
third means coupled to said second means, said source and said first means responsive to said control signal to synchronize said first series of gate pulses to the channels of said first plurality of multiplex channels; and fourth means coupled to said second means responsive to said control signal to produce a second series of channel gate pulses in synchronism with the channels of said second plurality of channels.

11. A generator according to claim 10, wherein said fourth means includes a binary counter, and a matrix coupled to said counter.

12. A generator to produce channel gate pulses for a composite time division multiplex pulse train including an intermixture of time division multiplex channels of different repetition rates comprising:

a source of said composite signal including a first plurality of time division multiplex channels, a synchronizing signal having a predetermined pat-plex channels occupying one channel of said said first multiplex channels, and a synchronizing signal having a predetermined pattern related to the repetition rates of said first and second plurality of multiplex channels;

first means coupled to said source to produce a first series of channel gate pulses at the repetition rate of the channels of said first plurality of channels;

second means coupled to said source and said first means responsive to a given one of said first series of gate pulses and said composite pulse trains to produce a control signal indicating the presence or absence of time coincidence between said given one of said first series of gate pulses and said synchronizing signals;

third means coupled to said second means, said source and said first means responsive to said control signal to snychronize said first series of gate pulses to the channels of said first plurality of multiplex channels;

fourth means coupled to said first means to produce frame pulses having a repetition rate equal to the frame rate of said first plurality of channels; and fifth means coupled to said second means and said fourth means responsive to said control signal and said frame pulses to produce a second series of channel gate pulses in synchronism with the channels of said second plurality of channels.

13. A generator according to claim 12, wherein said fifth means includes a binary counter, and a matrix coupled to said counter.

14. In a generator to produce channel gate pulses for time division multiplex channel signals, a pulse distributor comprising:

a source of said signals;

a delay line having taps therealong spaced according to the spacing of said channel signals and equal in number to at least one half the number of said said channel signals;

means coupled to said source to trigger said delay line;

means coupled to the last of said taps to retrigger said delay line; and a bistable device coupled to said source and said delay line to define in cooperation with the output of said taps said channel gate pulses.

15. A generator to produce channel gate pulses for a composite time division multiplex pulse train including an intermixture of time division multiplex channels of different repetition rates comprising:

a source of said composite pulse train including a first plurality of time division multiplex channels, a second plurality of time division multiplex channels occupying one channel of said first multiplex channels, a third plurality of time division multiplex channels occupying another channel of said first multiplex channels, and a synchronizing signal having a predetermined pattern related to the repetition rates of said first and second plurality of channels;

first means coupled to said source to produce a series of channel gate pulses at the repetition rate of the channels of said first plurality of channels;

second means coupled to said source and said first means responsive to a given one of said first series of gate pulses and said composite pulse train to produce a control signal indicating the presence or absence of time coincidence between said given one of said first series of gate pulses and said synchronizing signal;

third means coupled to said second means, said source and said first means responsive to said control signal to synchronize said first series of gate pulses to the channels of said first plurality of multiplex channels;

fourth means coupled to said source to produce a second series of channel gate pulses at the repetition rate of the channels of said second and third plurality of channels; and fifth means coupled to said second means and fourth means responsive to a given one of said second series of gate pulses and said control signal to synchronize said second series of gate pulses to the channels of said second and third plurality of channels.

16. A generator to produce channel gate pulses for a composite time division multiplex pulse train including an intermixture of time division multiplex channels of different repetition rates comprising:

a source of said composite pulse train including:

a first plurality of time division multiplex channels;

a second plurality of time division multiplex channels occupying one channel of said first multiplex channels, a third plurality of time division multiplex channels occupying one channel of said second multiplex channels, and a synchronizing signal having a predetermined pattern related to the repetition rates of said first, second and third plurality of multiplex channels;

first means coupled to said source to produce a first series of channel gate pulses at the repetition rate of the channels of said first plurality of multiplex channels;

second means coupled to said source and said first means responsive to a given one of said first series of gate pulses and said composite pulse train to produce a first control signal indicating the presence or absence of time coincidence between said given one of said first series of gate pulses and said synchronizing signal;

third means coupled to said second means, said source and said first means responsive to said first control signal to synchronize said first series of gate pulses to the channels of said first plurality of multiplex channels;

fourth means coupled to said source to produce a second series of channel gate pulses at the repetition rate of the channels of said second plurality of multiplex channels;

fifth means coupled to said source, said second means and said fourth means responsive to a given one of said second series of gate pulses, said composite pulse train, and said first control signal to produce a second control signal indicating the presence or absence of time coincidence between said given one of said second series of gate pulses and said first control signal;

sixth means coupled to said fifth means, said source and fourth means responsive to said second control signal to synchronize said second series of gate pulses to the channels of said second plurality of multiplex channels; and seventh means coupled to said fifth means responsive to said second control signal to produce a third series of channel gate pulses synchronized to said third plurality of multiplex channels.

17. A generator to produce channel gate pulses for a composite time division multiplex pulse train including an intermixture of time division multiplex channels of different repetition rates comprising:

a source of said composite pulse train including a first plurality of time division multiplex channels, a second plurality of time division multiplex channels occupying one channel of said first multiplex channels, a third plurality of time division multiplex channels occupying one channel of said second multiplex channels, a fourth plurality of time division multiplex channels occupying another channel of said second multiplex channels, and a synchronizing signal having a predetermined pattern related to the repetition rates of said first and second plurality of channels;

first means coupled to said source to produce a first series of channel gate pulses at the repetition rate of the channels of said first plurality of multiplex channels;

second means coupled to said source and said first means responsive to a given one of said first series of gate pulses and said composite pulse train to produce a first control signal indicating the presence or absence of time coincidence between said given one of said first series of gate pulses and said synchronizing signal;

third means coupled to said second means, said source and said first means responsive to said first control signal to synchronize said first series of gate pulses to the channels of said first plurality of multiplex channels;

fourth means coupled to said source to produce a second series of channel gate pulses at the repetition rate of the channels of said second plurality of multiplex channels;

fifth means coupled to said source, said second means and said fourth means responsive to a given one of said second series of gate pulses, said composite pulse train, and said first control signal to produce a second control signal indicating the presence or absence of time coincidence between said given one of said second series of gate pulses and said first control signal;

sixth means coupled to said fifth means, said source and fourth means responsive to said second control signal to synchronize said second series of gate pulses to the channels of said second plurality of multiplex channels; and seventh means coupled to said fifth means responsive to said second control signal to produce a third series of channel gate pulses synchronized to said third and fourth plurality of multiplex channels.

18. A generator to produce channel gate pulses for a composite time division multiplex pulse train including an intermixture of time division multiplex channels of different repetition rates comprising:

a source of said composite pulse train including a first plurality of time division multiplex channels, a second plurality of time division multiplex channels occupying at least two channels of said first multiplex channels, a third plurality of time division multiplex channels occupying at least two channels of said second plurality of multiplex channels contained in one of said two channels of said first multiplex channel, and a synchronizing signal having a predetermined pattern related to the repetition rates of said first, second and third plurality of channels;

first means coupled to said source to produce a series of channel gate pulses at the repetition rate of the channels of said first plurality of multiplex channels;

second means coupled to said source and said first means responsive to a given one of said first series of gate pulses and said composite pulse train to produce a first control signal indicating the presence or absence of time coincidence between said given one of said first series of gate pulses and said synchronizing signal;

third means coupled to said second means, said source and said first means responsive to said first control signal to synchronize said first series of gate pulses to the channels of said first plurality of multiplex channels;

fourth means coupled to said source to produce a second series of channel gate pulses at the repetition rate of the channels of said second plurality of multiplex channels;

fifth means coupled to said source, said second means and said fourth means responsive to a given one of said second series of gate pulses, said composite pulse train, and said first control signal to produce a second control signal indicating the presence or absence of time coincidence between said given one of said second series of gate pulses and said first control signal;

sixth means coupled to said fifth means, said source and fourth means responsive to said second control signal to synchronize said second series of gate pulses to the channels of said second plurality of multiplex channels; and seventh means coupled to said fifth means responsive to said second control signal to produce a third series of channel gate pulses synchronized to said third plurality of multiplex channels.

19. A generator to produce channel gate pulses for a composite time division multiplex pulse train including an intermixture of time division multiplex pulse trains of different repetition rates comprising:

a source of said composite pulse train including a first plurality of time division multiplex channels, a second plurality of time division multiplex channels occupying at least two channels of said first multiplex channels, a third plurality of time division multiplex channels occupying at least two channels of said second plurality of multiplex channels contained in one of said two channels of said first multiplex channels, a fourth plurality of time division multiplex channels occupying at least two channels of said second plurality of multiplex channels contained in the other of said two channels of said first multiplex channels, and a synchronizing signal having a predetermined pattern related to the repetition rates of said first, second and third plurality of channels;

first means coupled to said source to produce a first series of channel gate pulses at the repetition rate of the channels of said first plurality of multiplex channels;

second means coupled to said source and said first means responsive to a given one of said first series of gate pulses and said composite pulse train to produce a first control signal indicating the presence or absence of time coincidence between said given one of said first series of gate pulses and said synchronizing signal;

third means coupled to said second means, said source and said first means responsive to said first control signal to synchronize said first series of gate pulses to the channels of said first plurality of multiplex channels;

fourth means coupled to said source to produce a second series of channel gate pulses at the repetition rate of the channels of said second plurality of multiplex channels;

fifth means coupled to said source, said second means and said fourth means responsive to a given one of said second series of gate pulses, said composite pulse train, and said first control signal to produce a second control signal indicating the presence or absence of time coincidence between said given one of said second series of gate pulses and said first control signal;

sixth means coupled to said fifth means, said source and fourth means responsive to said second control signal to synchronize said second series of gate pulses to the channels of said second plurality of multiplex channels; and seventh means coupled to said fifth means responsive to said second control signal to produce a third series of channel gate pulses synchronized to said third and fourth plurality of multiplex channels.

References Cited

UNITED STATES PATENTS

| | | |
|---|---|---|
| 3,261,001 | 7/1966 | Magnin. |
| 3,334,183 | 8/1967 | Swift. |

ROBERT L. GRIFFIN, *Primary Examiner.*

J. A. ORSINO, Jr., *Assistant Examiner.*

U.S. Cl. X.R.

179—15; 328—56, 63; 340—167